(12) United States Patent
Sundar et al.

(10) Patent No.: US 8,849,005 B2
(45) Date of Patent: Sep. 30, 2014

(54) CORONARY ARTERY MOTION MODELING

(71) Applicants: Hari Sundar, Princeton Junction, NJ (US); Yang Gao, Princeton Junction, NJ (US)

(72) Inventors: Hari Sundar, Princeton Junction, NJ (US); Yang Gao, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 219 days.

(21) Appl. No.: 13/622,568

(22) Filed: Sep. 19, 2012

(65) Prior Publication Data

US 2013/0101187 A1     Apr. 25, 2013

Related U.S. Application Data

(60) Provisional application No. 61/540,129, filed on Sep. 28, 2011.

(51) Int. Cl.
G06K 9/00     (2006.01)
G06T 7/20     (2006.01)

(52) U.S. Cl.
CPC ... G06K 9/00362 (2013.01); G06T 2207/20076 (2013.01); G06T 7/2033 (2013.01); G06T 2207/10116 (2013.01); G06T 7/208 (2013.01); G06T 2207/10016 (2013.01); G06T 2207/30101 (2013.01); G06T 2207/30172 (2013.01)
USPC ..................................................... 382/132

(58) Field of Classification Search
CPC ....... G06T 7/0012; G06T 7/20; G06T 7/2033; G06T 7/2046; G06T 7/208; G06T 2207/30101; G06T 2207/30172; G06K 9/00362; G06K 2209/05
USPC .................. 382/128, 130, 132, 203, 258, 259
See application file for complete search history.

(56) References Cited

U.S. PATENT DOCUMENTS

| | | | |
|---|---|---|---|
| 2010/0172556 A1* | 7/2010 | Cohen et al. | 382/128 |
| 2010/0272315 A1* | 10/2010 | Tsin et al. | 382/103 |
| 2010/0310140 A1* | 12/2010 | Schneider et al. | 382/130 |
| 2011/0274334 A1* | 11/2011 | Zhu et al. | 382/132 |

OTHER PUBLICATIONS

Matthias Schneider, et al., "Automatic Global Vessel Segmentation and Catheter Removal Using Local Geometry Information and Vector Field Integration," 2010, IEEE pp. 45-48.
Hari Sundar, et al., "A Novel 2D-3D Registration Algorithm for Aligning Fluro Images With 3D Pre-Op CT/MR Images," Proceedings of SPIE, San Diego, CA, USA, Feb. 2006, vol. 6141.
Gunnar Farneback, et al., Very High Accuracy Velocity Estimation Using Orientation Tensors, Parametric Motion, and Simultaneous Segmentation of the Motion Field.

* cited by examiner

Primary Examiner — Andrew W Johns (57) ABSTRACT

A method for tracking coronary artery motion includes constructing (11) a centerline model of a vascular structure in a base phase image in a sequence of 2D images of coronary arteries acquired over a cardiac phase, computing (12), for each pixel in a region-of-interest in each subsequent image, a velocity vector that represent a change in position between the subsequent image and base phase image, calculating (13) positions of control points in each phase using the velocity vectors, and applying (14) PCA to a P×2N data matrix $X^T$ constructed from position vectors (x, y) of N centerline control points for P phases to identify d eigenvectors corresponding to the largest eigenvalues of $XX^T$ to obtain a d-dimensional linear motion model $\hat{\alpha}_p$, in which a centerline model for a new image at phase p+1 is estimated by adding $\hat{\alpha}_p$ to each centerline control point of a previous frame at phase p.

22 Claims, 4 Drawing Sheets

CORONARY ARTERY MOTION MODELING

CROSS REFERENCE TO RELATED UNITED STATES APPLICATIONS

This application claims priority from "Coronary Arteries Motion Modeling", U.S. Provisional Application No. 61/540,129 of Sundar, et al., filed Sep. 28, 2011, the contents of which are herein incorporated by reference in their entirety.

TECHNICAL FIELD

This disclosure is directed to methods for modeling coronary arteries in digital medical images.

DISCUSSION OF THE RELATED ART

Coronary artery disease is a common in many industrialized nations and causes thousands of deaths every year. During interventional procedures, 3-D imaging modalities like CT and MRI are not commonly used due to interference with the surgery and radiation exposure concerns. Therefore, real-time information is usually limited and building models of cardiac motion is challenging. For these reasons, 2-D X-ray angiography is a widely used imaging technique for both diagnosis and for treatment via percutaneous interventions. Quantitative assessment of coronary motion from these images can help in making accurate diagnosis for coronary diseases. In addition, motion models thus obtained can be used for providing a dynamic roadmap during interventions. Coronary motion modeling is an interesting topic and has been researched in depth; however, research on building models from angiographic images is limited. Although various 3D motion tracking techniques have been developed over the past decade, since the most common diagnostic modality and the only modality for interventions is 2-D X-Ray Angiography, coronary motion modeling based on 2-D X-ray images is still needed and can play a significant role in diagnosis.

The standard method for recovering motion of the coronary arteries is to track the motion of the arterial centerlines in the 2-D X-ray images. As the heart is beating periodically, for every cardiac phase, an artery tree that includes shape information of the cardiac vessels can be independently reconstructed.

The goal of coronary motion modeling is to start from such an artery tree and recover arterial shapes and deformation for every frame over all cardiac phases. The model reconstruction should have a straightforward solution, by repeating 2-D artery tree reconstruction for every cardiac phase. However, when put into practical use, it appears to be instable and slow. First, independent artery segmentation can cause a loss of time-continuity in the segmented vessels, which may strip the time-dynamic model of its diagnostic benefits. For example, a physician may want to modify or mark certain part of the artery segmentation, or even add new vessels that cannot be segmented during the artery tree reconstruction, but the features of an independent artery tree may not be able to be incorporated into the built model. Second, a segmentation for every phase, including post-processing, can be quite slow and is thus not suitable for real-time applications, like live diagnosis.

Due to issues with existing vessel segmentation algorithms and the lack of contrast in occluded vessels, manual segmentation of certain branches is usually necessary. In addition, such occluded branches may be the most important vessels during coronary interventions and obtaining motion models for these can greatly help in reducing the procedure time and radiation exposure. Segmenting different cardiac phases independently does not guarantee temporal consistency and is not efficient for occluded branches required manual segmentation.

SUMMARY

Exemplary embodiments of the invention as described herein generally include systems and methods for coronary motion modeling for 2-D X-ray images that can extract the coronary artery tree for every cardiac phase and maintain the segmentation by tracking the coronary artery tree during the cardiac cycle. According to an embodiment of the invention, artery centerlines are modeled as polygonal lines and tracked as they move and deform over a single period of all cardiac phases due to the beating of the heart, and the deformed arteries and recorded ECG signals are stored for each cardiac phase. A model according to an embodiment of the invention can map every frame to the specific cardiac phase using ECG values, thus shape information of the coronary arteries can be inferred using the model corresponding to its phase. A model according to an embodiment of the invention has real-time performance, and the physician can manually adjust the auto-segmented artery tree.

According to an aspect of the invention, there is provided a method for tracking coronary artery motion in a sequence of 2D images, including constructing a centerline model of a segmented vascular structure in a base phase image in a sequence of 2D images of coronary arteries acquired over one or more cardiac phases, computing, for each pixel in a region-of-interest (ROI) in each subsequent image in the sequence of 2D images, a velocity vector that represent a change in position between the subsequent image and base phase image in the sequence of 2D images, calculating positions of control points i in each phase p using the velocity vectors $\bar{v}_i^T = (v_{i,x}, v_{i,y})^T$, and applying PCA to a P×2N data matrix $X^T$ constructed from position vectors (x, y) of N centerline control points $\{V_0^{(p)}, V_1^{(p)}, \ldots, V_{N-1}^{(p)}\}$ for P phases to identify d eigenvectors corresponding to the largest eigenvalues of $XX^T$ to obtain d-dimensional linear motion model $$\hat{a}_p \leftarrow \bar{m}_p + \sum_{i=1}^{d} \alpha_{p,i} v_i,$$

where $\bar{m}_p$ is a mean value of 2N control points positions (x, y) at phase p of the cardiac cycle, $v_i$ is an eigenvector of U=cov $(XX^T)$, and the $\alpha_{p,i}$'s are determined for each phase p, in which a centerline model for a new image at phase p+1 is estimated by adding $\hat{a}_p$ to each centerline control point of a previous frame at phase p.

According to a further aspect of the invention, the centerline model is parametrically represented by a set of vessel segments connected by a set of control points, in which each vessel segment is approximated by a 2D B-spline curve parameterized by chord length.

According to a further aspect of the invention, the 2D B-spline curve for a $k^{th}$ centerline segment is defined as $$C_k(u) = \sum_{i=0}^{n_k-1} B_{i,q}(u) V_i^k,$$

in which $u \in [0,1]$, the $\{V_i^k\} \in R^2$ are $n_k$ control points of the centerline and the $\{B_{i,q}\}$ are $q^{th}$-degree B spline basis functions, in which end values of each curve $C_k$ are constrained so that $C_k(0) = V_0^k = (s_0 \in S_k)$, $C_k(1) = V_{n_k}^k = (s_{m_k} \in S_k)$ in which $S_k$ denotes a $k^{th}$ segment, and $S_{m_k}$ denotes an $m^{th}$ point in the $k^{th}$ segment.

According to a further aspect of the invention, constructing the centerline model comprises processing the base phase image with a Hessian-based vessel enhancement filter, and computing centerlines by numerically integrating a directional vector field obtained from the Hessian-based vessel enhancement filter.

According to a further aspect of the invention, the method includes receiving manual adjustments to the centerline model.

According to a further aspect of the invention, computing a velocity vector comprises calculating $\overline{v}_i = -\overline{S}_i \cdot \overline{Q}^{-1} \cdot q$, in which $\overline{v}_i = (v_{x_i}, v_{y_i})$ is the velocity vector for control point i, $$Q = \sum_i Q_i = \sum_i S_i^T T_i S_i = \begin{pmatrix} \overline{Q} & q \\ q^T & \alpha \end{pmatrix},$$

$$S_i = \begin{pmatrix} x_i & y_i & 1 & 0 & 0 & 0 & 0 \\ 0 & 0 & 0 & x_i & y_i & 1 & 0 \\ 0 & 0 & 0 & 0 & 0 & 0 & 1 \end{pmatrix},$$

$$\overline{S}_i = \begin{pmatrix} x_i & y_i & 1 & 0 & 0 & 0 \\ 0 & 0 & 0 & x_i & y_i & 1 \end{pmatrix},$$

and $T_i$ is an isotropy compensated orientation tensor for control point i.

According to a further aspect of the invention, the isotropy compensated orientation tensor $T_i$ is calculated by stacking all images of the sequence of 2D images onto each other to form a 3D image f, and defining $T_i$ as $T_i = A_i A_i^T + \gamma b_i b_i^T - \lambda_{i,min} I$, in which I is the identity matrix, $\lambda_{min}$ is the smallest eigenvalue of $\tilde{T}_i = A_i A_i^T + \gamma b_i b_i^T$, $A_i$ and $b_i$ are found by fitting the image intensity $f(x_i)$ of the control points $x_i$ to a second degree polynomial $f(x) \sim x^T A x + b^T x + c$, and $\gamma$ is a non-negative weight factor between even and odd parts of the image.

According to a further aspect of the invention, each image in the sequence of 2D images of coronary arteries is mapped to a cardiac phase by a recorded electrocardiogram signal.

According to a further aspect of the invention, the method includes performing reverse-PCA analysis to estimate a vector $\hat{m}_p$ of centerline control points at cardiac phase p from PCA parameter vector $\hat{\alpha}_p$.

According to a further aspect of the invention, the ROI in the subsequent image is determined by projecting a region around the centerline in the base phase image onto the subsequent image, and determining a centerline in the subsequent image by registering the centerline in the base phase image to the ROI in the subsequent image.

According to a further aspect of the invention, the method includes determining model parameters $\vec{\alpha} = (\alpha_1, \ldots, \alpha_d)$ by minimizing $$\sum_{k=1}^{2} C_k(I_k, Y_0, M^d(\vec{\alpha}))$$

in which $C_k(I_k, Y_0, \vec{m})$ is a similarity measure between a 2D image I of camera k and a preoperative 3-D centerline segmentation $Y_0$ transformed according to a rigid mapping $M^d$ and projected into a camera coordinate frame.

According to a further aspect of the invention, the method includes fitting polynomial curves for each of the parameters $\alpha_i$ and the position/orientation of a sensor that reports its position and orientation using $$\alpha_{p,i} = \sum_{j=1}^{6} P_{p,j}^q(S_j),$$

in which p is the cardiac phase. P is a $q^{th}$ order polynomial functions, and $S_j$ are the position and orientation of the sensor.

According to another aspect of the invention, there is provided a non-transitory program storage device readable by a computer, tangibly embodying a program of instructions executed by the computer to perform the method steps for tracking coronary artery motion in a sequence of 2D images,

DETAILED DESCRIPTION OF EXEMPLARY EMBODIMENTS

Exemplary embodiments of the invention as described herein generally include systems and methods for modeling coronary artery motion. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-dimensional images and voxels for 3-dimensional images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-dimensional picture or a 3-dimensional volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Vessel Segmentation

A motion tracking method of the coronary artery motion according to an embodiment of the invention uses a prior 2-D model of the artery tree. An artery tree comprises a set of discrete centerlines populating the vascular structure, which have been previously segmented from a 2-D image. An exemplary, non-limiting 2-D image is an X-ray image, but embodiments of the invention are not limited thereto. To extract the centerlines from the segmented vessels, the angiogram images are first processed with a set of Hessian-based vessel-enhancement filters. The components of the Hessian matrix, which are second derivatives of the image, are computed by convolution (spatial or spectral depending on the scale) with the corresponding derivative of a Gaussian kernel. The centerlines are computed by numerical integration of the directional vector field obtained from the eigenvectors of the Hessian. Additional post-processing may also be performed to obtain more accurate results.

According to an embodiment of the invention, to enable manual adjustment and reduce storage, the discrete representation of the tree may be converted to a parametric representation. An exemplary, non-limiting parametric representation uses cubic B-splines. The use of cubic B-spline provides a continuous representation and intrinsic smoothness in the 2-D images. The arteries tree is first decomposed into a set of vessel segments $\{S_0, S_1, \ldots\} \in R^2$ For each segment, an approximating parametric curve $C_k(u) \in R^2$ is fit to each $S_k(u) = \{s_0, s_1, \ldots, s_{m_k}\} \in R^2$, where $\{s_i\}$ are the points forming $S_k$, using a chord length parameterization u so that $$\{C_k(u)|u \in [0,1]\} \approx S_k. \tag{1}$$

Specifically, $C_k(u)$ is a 2-D B-spline curve defined as $$C_k(u) = \sum_{i=0}^{n_k-1} B_{i,q}(u) V_i^k, \tag{2}$$

where the $\{V_i^k\} \in R^2$ are the $n_k$ control points ($i = 0, \ldots, n_k-1$), and the $\{B_{i,q}\}$ are the qth-degree B-spline basis functions. The values at the ends of the fitted curve $C_k$ will share the same values with original segmentation $S_k$. Those values are constrained so that $$C_k(0) = V_0^k = (s_0 \in S_k), \tag{3}$$

$$C_k(1) = V_{n_k}^k = (s_{m_k} \in S_k). \tag{4}$$

According to an embodiment of the invention, cubic B-spline functions (degree q=3) are used for all artery segments. As the fitted curve $C_k$ approximates the segmentation $S_k$, the introduction of control points $\{V_i^k\}$ allows a physician to manually adjust the segmented arteries' shape, or add new vessel that cannot be automatically segmented. After the physician has corrected the parameterized coronary tree using cubic B splines, the tree is stored, and it is ready to start the motion tracking procedure.

Motion Models

According to an embodiment of the invention, a sequence of T 2D images $\{I_t|t=0, \ldots, T-1\}$ is given. An exemplary, non-limiting 2-D image is an X-ray image, but embodiments of the invention are not limited thereto. Recorded ECG signals allow mapping each frame t into one of P discrete cardiac phases, p=0, 1, ..., P-1. According to an embodiment of the invention, a physician selects an optimal image $I_t$ for segmentation as a base phase (phase 0), and the fitted curve $\{C_k\}$ is used to segment the base phase image. As the segmented artery tree is approximated by the fitted curves $\{C_k\}$, the physician may adjust the tree reconstructed from each image $I_t$ using the control points $\{V_i^k\}$. According to an embodiment of the invention, $\{V_i^k\}$ is a parametric representation of the optimized artery tree that contains shape and length information of the coronary vessels. Therefore, only the control points $\{V_i^k\}$ need to be tracked through the different cardiac phases, and a new artery tree can be reconstructed by fitting the tracked control points.

For a coronary artery tree of $N_c$ fitted curves, each curve $C_k$ can be represented by $n_k$ control points $\{V_i^k\}$. The motion tracking model is in the form of a set of those 2-D control points, $\{V_0^{(p)}, V_0^{(p)}, \ldots, V_{N-1}^{(p)}\}$, where p denotes point positions in different phases, p=0, 1, ..., P-1, and $$N = \sum_{i=0}^{N_c-1} n_k.$$

The challenge is to infer the position of these points for all other cardiac phase and to reconstruct the deformed arteries tree for each phase. Then, each frame can be mapped into one of the cardiac phase using the ECG value, and artery tree information can be extracted from a model according to an embodiment of the invention.

In the following, $I_k$ is set as the base phase (phase 0), in which artery segmentation and manual adjustment is performed. Since the position of points $\{V_0^{(p)}, V_0^{(p)}, \ldots, V_{N-1}^{(p)}\}$ will be tracked through all P cardiac phases, movement behavior will be tracked from $I_k$ to $I_{k+P-1}$.

Embodiments of the invention adapt a velocity estimation method disclosed in Farneback, "Very high accuracy velocity estimation using orientation tensors, parametric motion, and simultaneous segmentation of the motion field", Proc. ICCV (2001), pgs. 171-177, the contents of which are herein incorporated by reference in their entirety, to track motion in that cardiac period.

Farneback discloses that by stacking frames of a 2D image sequence onto each other, one may obtain a spatiotemporal image volume f with two spatial dimensions and a third temporal dimension. A useful representation of local orientation in the image volume is the orientation tensor, which in 3D takes the form of a 3×3 symmetric positive semidefinite matrix T.

To estimate a 3D orientation tensor, one projects the image value for each point x onto a second degree polynomial:

$$f(x) \sim x^T A x + b^T x + c \tag{5}$$

The parameters A, b, and c can be computed by a Gaussian weighted least squares approximation of the image by, e.g., a hierarchical scheme of separable convolutions. From the model parameters, the orientation tensor can be constructed from $$\tilde{T} = AA^T + \gamma bb^T \tag{6}$$

where γ is a non-negative weight factor between the even and the odd parts of the image. As a further preprocessing step an isotropy compensated tensor can be computed:

$$T = \tilde{T} - \lambda_{min} I, \tag{7}$$

where $\lambda_{min}$ is the smallest eigenvalue of $\tilde{T}$.

According to an embodiment of the invention, in a region of interest (ROI) of a frame corresponding to a phase p where the motion may be assumed to be coherent (i.e. control point trajectories are strongly correlated spatially and locally smoothly varying, indicating that they are from the same object), the 2-D velocity vector $(v_x, v_y)^T$ for each pixel can be extended to a 3-D spatiotemporal directional vector v that can be expressed as $$v = \begin{pmatrix} v_x \\ v_y \\ 1 \end{pmatrix}, \quad (8)$$

$$v_x(x,y) = ax + by + c, \quad (9)$$

$$v_y(x,y) = dx + ey + f, \quad (10)$$

where x and y are image pixel coordinates. The ROI may be a small region around the centerline in the base phase image projected on the subsequent image, which serves as an estimate for the maximum motion between frames. Embodiments of the invention do not completely segment the subsequent images, but compute the hessian matrix, which is used to register the centerline from the base image with the subsequent images.

EQS. (8)-(10) can be rewritten as a parametric model:

$$v = Sp, \quad (11)$$

$$S = \begin{pmatrix} x & y & 1 & 0 & 0 & 0 \\ 0 & 0 & 0 & x & y & 1 \\ 0 & 0 & 0 & 0 & 0 & 1 \end{pmatrix}, \quad (12)$$

$$p = (abcdef)^T. \quad (13)$$

The parameters of the model can be estimated directly from the orientation tensors in the region by using $v^T T v$ as a cost function, where T is the isotropy compensated tensor derived above. Summing the cost function over all control points in the centerline and applying the motion model, one can obtain $$d_{total}(p) = \sum_i v_i^T T_i v_i = \sum_i p^T S_i^T T_i S_i p = p^T Q_{total} p, \quad (14)$$

where $$Q_{total} = \sum_i Q_i = \sum_i S_i^T T_i S_i = \begin{pmatrix} \overline{Q} & q \\ q^T & \alpha \end{pmatrix}, \quad (15)$$

The optimized parameter vector p of the motion model can be calculated by minimizing EQ. (14) under the constraint that the last element of p be 1:

$$p = \begin{pmatrix} \overline{p} \\ 1 \end{pmatrix}, \quad (16)$$

which transforms EQ. (14) into $$d_{tot}(p) = \overline{p}^T \overline{Q} \overline{p} + \overline{p}^T q + q^T \overline{p} + \alpha, \quad (17)$$

which is minimized by $$\overline{p} = -\overline{Q}^{-1} q. \quad (18)$$

The velocity vector can be written as $$\overline{v}_i = -\overline{S}_i \cdot \overline{Q}^{-1} \cdot q \quad (19)$$

where $$\overline{S}_i = \begin{pmatrix} x_i & y_i & 1 & 0 & 0 & 0 \\ 0 & 0 & 0 & x_i & y_i & 1 \end{pmatrix}.$$

Therefore, the velocity vector $\overline{v}^T = (v_x, v_y)^T$ can be computed to track the control points $\{x_i^{(p)}\}_{i=0,\ldots,N-1}$ of phase p to a next phase $\{x_i^{(p+1)}\}_{i=0,\ldots,N-1}$. After motion tracking for all P phases, one has the control point positions for all phases so that one can reconstruct the coronary artery tree for each phase by fitting those control points.

According to an embodiment of the invention, principal component analysis (PCA) can be used to model the coronary arteries motion behavior. A PCA based model according to an embodiment of the invention can determine a relationship between phase p and the positions of the coronary arteries at that phase, as follows. For a series of 2D X-ray images, the tracked control points i among different phases calculated using the velocity vectors $\overline{v}_i^T = (v_{i,x}, v_{i,y})^T$ are used as input for a PCA model according to an embodiment of the invention. For each phase p, the positions (x, y) of N control points $\{V_0^{(p)}, V_1^{(p)}, \ldots V_{N-1}^{(p)}\}$ are used as a 2N sized feature vector. For P phases, one can construct a P×2N data matrix $X^T$. Singular value decomposition is applied to $X^T$ to compute the eigenvalues $\lambda_1 \geq \ldots \geq \lambda_{2N}$ and corresponding eigenvectors $v_1, \ldots, v_{2N}$ of the covariance matrix U, where $X^T = U\Sigma^T V^T$. Then PCA is applied to $X^T$ to find the corresponding basis vectors. The basis of the d-dimensional linear sub-manifold (d≤2/N) is then identified as the first d eigenvectors corresponding to the largest eigenvalues $\lambda_1, \ldots, \lambda_d$. According to an embodiment of the invention, for N=20 samples, one can obtain d=3 where the first 3 dimensions can cover 95 percent energy in the spectrum of U. According to an embodiment of the invention, one may then eventually obtain, at each phase p, a d-dimensional linear motion model $M^d$:

$$M^d: R^d \to R^{2N}, \hat{\alpha}_p \leftarrow \overline{m}_p + \sum_{i=1}^{d} \alpha_{p,i} v_i, \quad (20)$$

where $\overline{m}_p$ is the mean value of the 2N control points positions (x, y) at phase p of the cardiac cycle. With a PCA model according to an embodiment of the invention, the continuous relationship of image phase p to a lower dimension space of PCA parameter vector $\hat{\alpha}$, which represents the coronary artery shapes, can be established. Given a PCA model according to an embodiment of the invention, for the motion of the coronary arteries, the remaining question concerns estimating the PCA parameter vector $\alpha_i$. Two cases may be considered here.

(1) The model is used to help register with noisy/occluded image: This situation arises when the registration target has some information, but where either noise or occlusions may prevent an accurate and robust registration. In such cases, optimizing over the PCA parameters, instead of the full transformation, constrains the registration based on the prior motion model and produces better results. The estimated motion model provides a low-dimensional parameterization that spans the space of valid configurations within the cardiac cycle. Therefore, a patient-specific model according to an embodiment of the invention can be used as a prior to restrict the search space during re-registrations. Optimization is no longer performed for all parameters describing an arbitrary transform, such as rigid, affine, or non-rigid parameters, but only for d model parameters $\vec{\alpha}=(\alpha_1, \ldots, \alpha_d)$, the principle components, to estimate the pose parameters:

$$\hat{\vec{m}} = M^d\left(\arg\min_{\vec{\alpha}\in R^d}\sum_{k=1}^{2} C_k(I_k, Y_0, M^d(\vec{\alpha}))\right) \quad (21)$$

where $C_k(I_k, Y_0, \vec{m})$ is a similarity measure. An exemplary, non-limiting similarity measure is based on a modified Euclidean distance transform that describes the distance between the angiogram I of camera k and the preoperative 3-D centerline segmentation $Y_0$ which is transformed according to the rigid mapping $M^d$ and projected into the camera coordinate frame. $I_1$ and $I_2$ are two corresponding camera images of the biplane system. For a monoplane setting $C_2$ is set to zero. It should be noted that the utilization of a motion model according to an embodiment of the invention is not limited to the particular 2-D/3-D registration herein disclosed, but may also be leveraged in any other registration framework.

Live fluoroscopic images for X-ray guidance during a percutaneous coronary intervention (PCI) for a chronic total occlusion (CTO) are usually acquired without contrast due to the occlusion and the limited expected benefit. Therefore, most of the structural information is missing, which makes the registration problem ill-posed and challenging. The guiding catheter and guidewire (GW) provide the only indication of the hidden coronary arteries. A registration workflow according to an embodiment of the invention is similar to an angiography case with contrast but incorporates 2-D GW tracking combined with a similarity measure using the mean point-wise difference of the tracked GW and the projected 3-D segmentation to assess the quality of the considered overlay. Strictly speaking, only a subset of the 3-D segmentation is considered in this case, which describes a roadmap of the planned GW path defined by the location of the CTO. This information is available from the planning prior to the procedure. An optimization according to an embodiment of the invention uses one additional parameter as an offset in the preselected roadmap to compute the mean point-wise distance to the tracked GW.

(2) The model is used with a sensor correlated with cardiac motion: This case is occurs when imaging information is either unavailable or unusable for registration, e.g. due to the lack of contrast. In such cases, additional information from fiducials or electromagnetically tracked sensors may be used to drive the model. Consider, for example, a sensor that reports its position and orientation. Then, once there is a motion model according to an embodiment of the invention, there is a function $f$ that correlates the position and orientation (a 6 component vector) to the parameters $\alpha_i$ of the PCA model. The function $f$ can be estimated by curve fitting, specifically in our case we use b-Spline curves.

During a procedure, when imaging data is insufficient, polynomial curves are fit for each of the parameters $\alpha_i$ and the position/orientation of the sensor:

$$\alpha_{p,i} = \sum_{j=1}^{6} P_{p,j}^q(S_j) \quad (22)$$

where p is the cardiac phase, P is a $q^{th}$ order polynomial functions, and $S_j$ are the position and orientation of the sensor. In general, $P_{p,j}^q$ is a polynomial of the form $$P_{p,i}^q = \sum_{i=0}^{q} a_{p,i} x^i.$$

Exemplary, non-limiting embodiments used cubic polynomials to estimate the parameters for the polynomial function. Practically, one needs to estimate 6×(q+1) parameters. Therefore, the order is dictated by the number of frames available for building the model. The parameters $P_{p,j}^q$ may be estimated from the values for α obtained from the model of EQ. (20) and the positions/orientations of the sensor at that specific configuration. Once the parameters $\alpha_i$ have been estimated for all polynomial functions $P_{p,j}$, during the procedure, the PCA parameters $\alpha_i$ may be estimated from the sensor position/orientation $S_j$ using EQ. (22).

Figure 1:
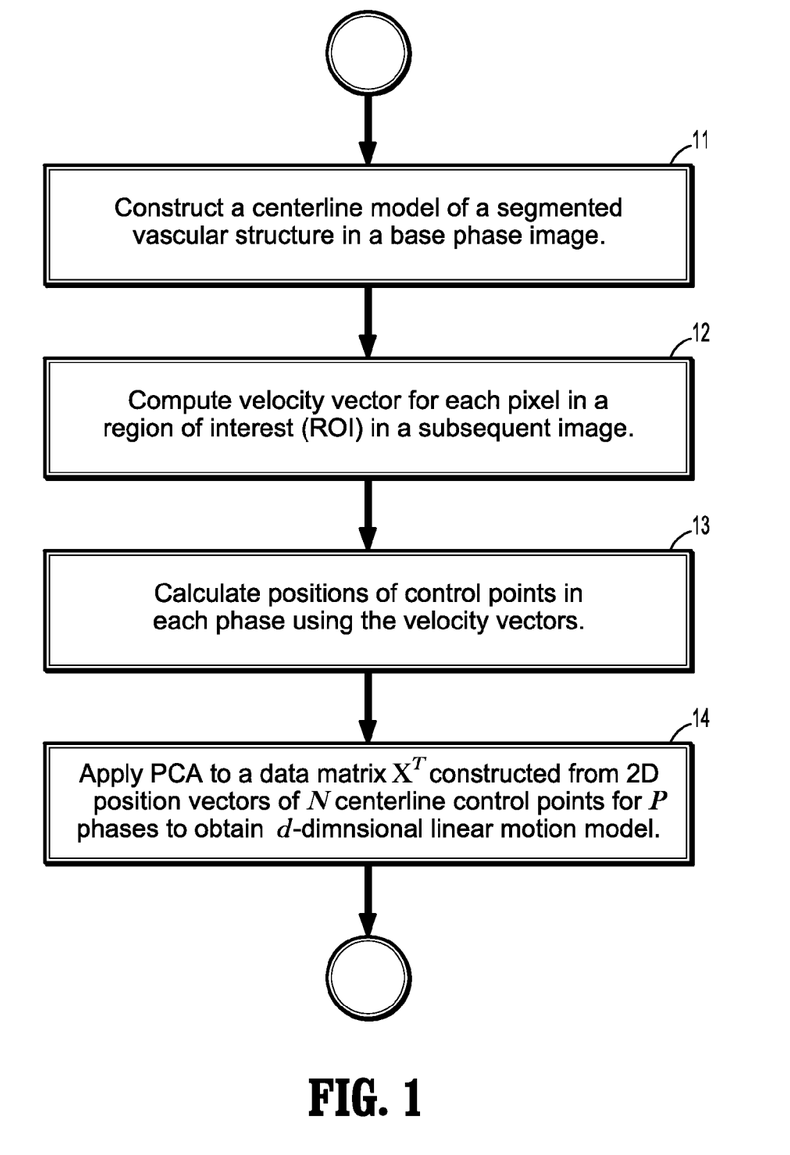
FIG. 1 is a flowchart of a method for modeling coronary artery motion, according to an embodiment of the invention.

A flowchart of a method for modeling coronary artery motion according to an embodiment of the invention is shown in FIG. 1. A method according to an embodiment of the invention begins at step 11 by constructing a centerline model of a segmented vascular structure in a base phase image in a sequence of 2D images of coronary arteries acquired over one or more cardiac phases. The centerline model may be parametrically represented by a set of vessel segments connected by a set of control points, in which each vessel segment is approximated by a 2D B-spline curve parameterized by chord length. Next, at step 12, for each pixel in a region-of-interest (ROI) in each subsequent image, a velocity vector is computed that represent a change in position between the subsequent image and the base phase image. The ROI in the subsequent image may be determined by projecting a region around the centerline in the base phase image onto the subsequent image, and determining a centerline in the subsequent image by registering the centerline in the base phase image to the ROI in the subsequent image. Using the velocity vectors, positions of centerline control points are calculated for each phase of the cardiac cycle, at step 13. At step 14, PCA is applied to a data matrix $X^T$ constructed from 2D position vectors of N centerline control points for P phases to identify d eigenvectors corresponding to the largest eigenvalues of $XX^T$ to a obtain d-dimensional linear motion model that can advance each centerline control point at a given cardiac phase image frame to a next cardiac phase image frame.

After building a model according to an embodiment of the invention, for a new frame of phase p+1, the coronary artery shapes can be estimated by vectorially adding $\hat{\alpha}_p$ to each centerline control point of a previous frame of phase p. Embodiments can also use interpolation, such as linear interpolation or B-Spline interpolation, in this stage to estimate the PCA parameter vector $\hat{\alpha}$ for phase p. Reverse-PCA analysis can then be used: $\hat{m}=M^d(\hat{\alpha})$, where the result $\hat{m}$ denotes the estimated control points positions $\{\hat{V}_0^{(p)}, \hat{V}_1^{(p)}, \ldots, \hat{V}_{N-1}^{(p)}\}$ of this new image. The shape information of the coronary arteries can be retrieved by fitting these control points using B-Splines. For any new frame, the ECG value of the frame can be used to obtain the cardiac phase and to find a matched phase from the model, after which the control point positions can be loaded and their artery tree can be reconstructed.

Experimental Results

Experiments were conducted on X-ray sequences acquired from more than 20 patient to test the performance and speed of a coronary artery motion modeling algorithm according to an embodiment of the invention. The X-ray sequences were acquired using a biplane C-arm system. the AXIOM Artis available from Siemens Medical Solutions, Erlangen, Germany. The ECG signal is recorded in sync with the image sequence, which allows mapping X-ray images to different cardiac phases.

The experiments were designed to test the performance and speed of a coronary arteries motion modeling algorithm according to an embodiment of the invention. For a tracking process in a single cardiac cycle, tracking between two X-ray images of size 512×512 pixels takes approximately 0.5 s in average on an Intel Xeon 5120@1.86 Hz and 2 GB of RAM. A model building procedure according to an embodiment of the invention may take less than 10 s for patient data with a cardiac cycle of 12~16 frames, including vessel segmentation and coronary arteries tree regularization. The speed can still be improved by using a CPU or by multi-thread/multi-core optimization. After a model according to an embodiment of the invention is built, the artery tree information of every frame can be instantly extracted by matching the recorded ECG signal to a certain phase, since tree information of every cardiac phase is already stored.

Figure 2:
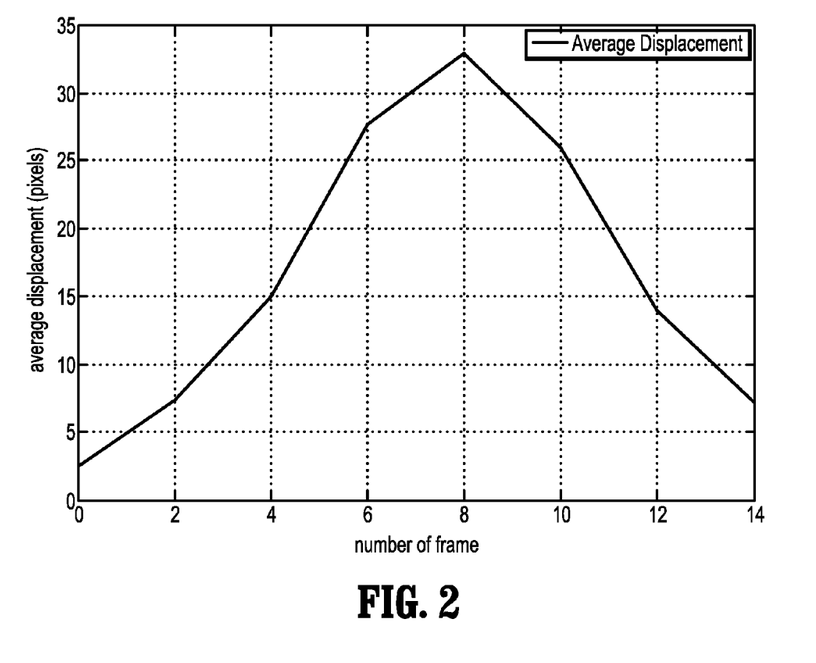
FIG. 2 shows mean displacement magnitudes between successive image frames in one cardiac cycle for one patient, according to an embodiment of the invention.

Motion tracking according to an embodiment of the invention was performed over one cardiac cycle, which ranged between 12 and 16 frames in different data sets. The mean displacement magnitudes between successive image frames in one cardiac cycle for one patient are illustrated in FIG. 2. For images of size 512×512, by setting the tracking neighborhood to 35 pixels to cover fast motion cases, one can correctly track the artery tree. This tracking neighborhood works for most cases among the data sets used in the experiments.

Figure 3:
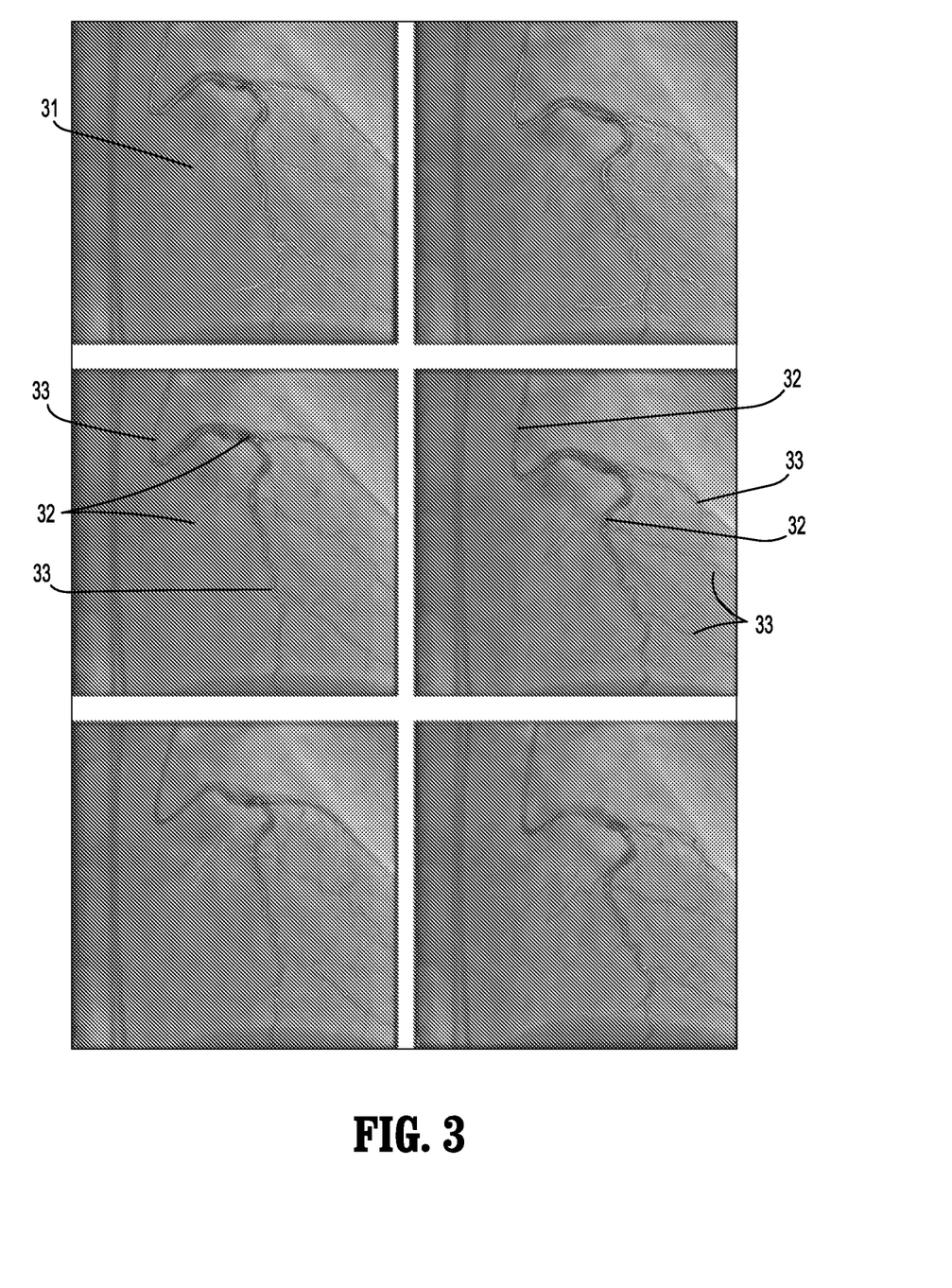
FIG. 3 illustrates tracking and matching results for data of one patient, according to an embodiment of the invention.

Tracking and matching results for data of one patient are presented in FIG. 3. The top 2 rows present tracking results over the cardiac cycle. The results in the first row show that a manual adjustment, such as adding a vessel 31, is also effective during tracking. The second row shows the movement magnitude for different artery parts. Fast and slow movements are indicated as 32 and 33, respectively. The bottom row images are present results of phase matching to a coronary artery motion model according to an embodiment of the invention. The images can show that arteries at the same phase share the same distribution of movement magnitudes.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 4:
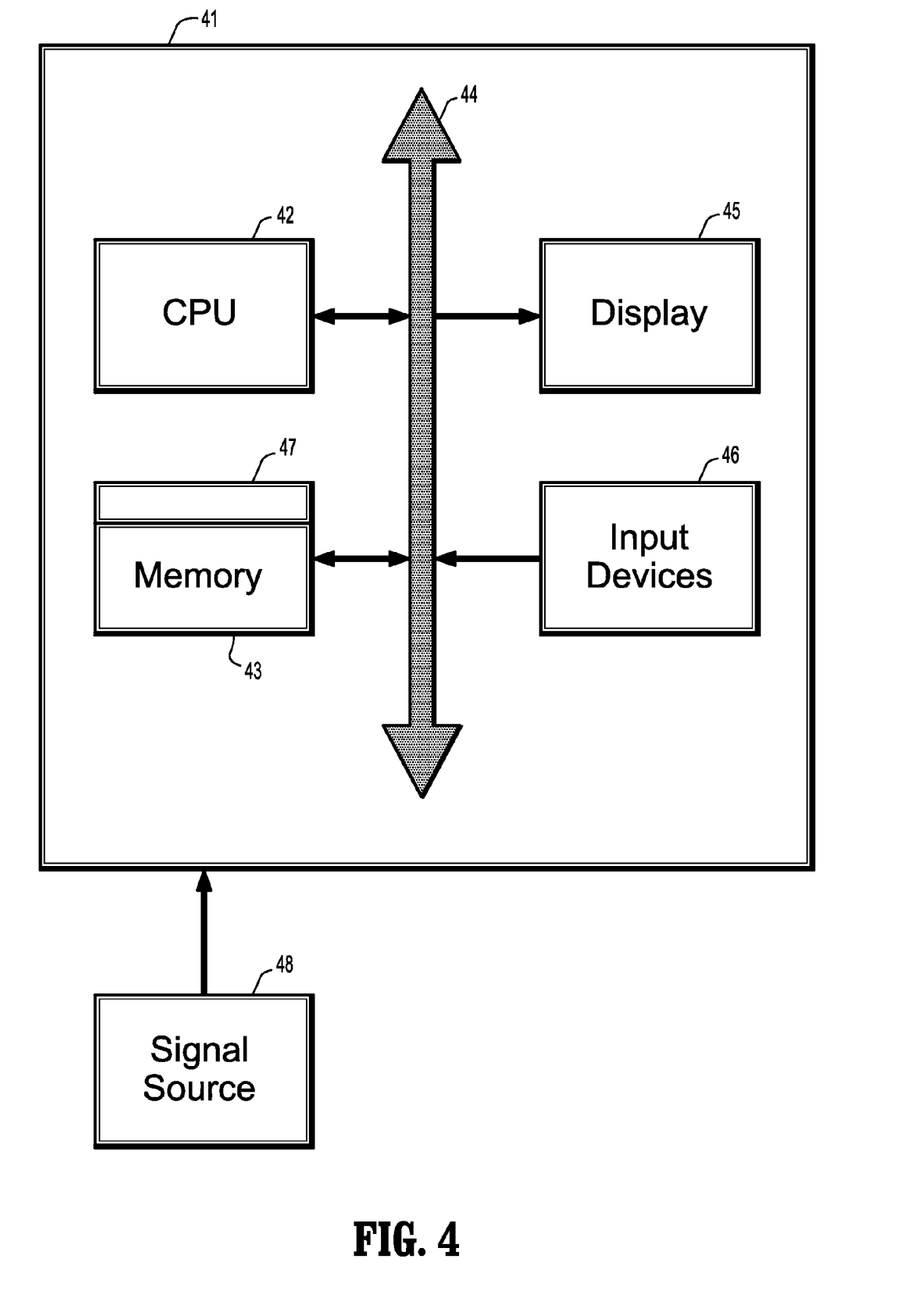
FIG. 4 is a block diagram of an exemplary computer system for implementing a method for modeling coronary artery motion, according to an embodiment of the invention.

FIG. 4 is a block diagram of an exemplary computer system for implementing a method for modeling coronary artery motion according to an embodiment of the invention. Referring now to FIG. 4, a computer system 41 for implementing the present invention can comprise, inter alia, a central processing unit (CPU) 42, a memory 43 and an input/output (I/O) interface 44. The computer system 41 is generally coupled through the I/O interface 44 to a display 45 and various input devices 46 such as a mouse and a keyboard. The support circuits can include circuits such as cache, power supplies, clock circuits, and a communication bus. The memory 43 can include random access memory (RAM), read only memory (ROM), disk drive, tape drive, etc., or a combinations thereof. The present invention can be implemented as a routine 47 that is stored in memory 43 and executed by the CPU 42 to process the signal from the signal source 48. As such, the computer system 41 is a general purpose computer system that becomes a specific purpose computer system when executing the routine 47 of the present invention.

The computer system 41 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method of tracking coronary artery motion in a sequence of 2D images, comprising the steps of:

constructing a centerline model of a segmented vascular structure in a base phase image in a sequence of 2D images of coronary arteries acquired over one or more cardiac phases;

computing, for each pixel in a region-of-interest (ROI) in each subsequent image in the sequence of 2D images, a velocity vector that represent a change in position between the subsequent image and base phase image in the sequence of 2D images;

calculating positions of control points i in each phase p using the velocity vectors $\overline{v}_i^T = (v_{i,x}, v_{i,y})^T$; and applying PCA to a P×2N data matrix $X^T$ constructed from position vectors (x, y) of N centerline control points $\{V_0^{(p)}, V_1^{(p)}, \ldots, V_{N-1}^{(p)}\}$ for P phases to identify d eigenvectors corresponding to the largest eigenvalues of $XX^T$ to obtain d-dimensional linear motion model $$\hat{\alpha}_p \leftarrow \overline{m}_p + \sum_{i=1}^{d} \alpha_{p,i} v_i,$$

where $\overline{m}_p$ is a mean value of 2N control points positions (x, y) at phase p of the cardiac cycle, $v_i$ is an eigenvector of U=cov ($XX^T$), and the $\alpha_{p,i}$'s are determined for each phase p, wherein a centerline model for a new image at phase p+1 is estimated by adding $\hat{\alpha}_p$ to each centerline control point of a previous frame at phase p.

2. The method of claim 1, wherein said centerline model is parametrically represented by a set of vessel segments connected by a set of control points, wherein each vessel segment is approximated by a 2D B-spline curve parameterized by chord length.

3. The method of claim 2, wherein the 2D B-spline curve for a $k^{th}$ centerline segment is defined as $$C_k(u) = \sum_{i=0}^{n_k-1} B_{i,q}(u) V_i^k,$$

wherein $u \in [0,1]$, the $\{v_1^k\} \in R^2$ are $n_k$ control points of the centerline and the $\{B_{i,q}\}$ are $q^{th}$ degree B-spline basis functions, wherein end values of each curve $C_k$ are constrained so that $$C_k(0) = V_0^k = (s_0 \in S_k), C_k(1) = V_{n_k}^k = (s_{m_k} \in S_k)$$

wherein $S_k$ denotes a $k^{th}$ segment, and $S_{m_k}$ denotes an $m^{th}$ point in the $k^{th}$ segment.

4. The method of claim 1, wherein constructing said centerline model comprises processing said base phase image with a Hessian-based vessel enhancement filter, and computing centerlines by numerically integrating a directional vector field obtained from the Hessian-based vessel enhancement filter.

5. The method of claim 4, further comprising receiving manual adjustments to the centerline model.

6. The method of claim 1, wherein computing a velocity vector comprises calculating $\overline{v}_i = -\overline{S}_i \cdot \overline{Q}^{-1} \cdot q$, wherein $\nabla_i = (v_{x_i}, v_{y_i})$ is the velocity vector for control point i, $$Q = \sum_i Q_i = \sum_i S_i^T T_i S_i = \begin{pmatrix} \overline{Q} & q \\ q^T & \alpha \end{pmatrix},$$

$$S_i = \begin{pmatrix} x_i & y_i & 1 & 0 & 0 & 0 \\ 0 & 0 & 0 & x_i & y_i & 1 & 0 \\ 0 & 0 & 0 & 0 & 0 & 0 & 1 \end{pmatrix},$$

$$\overline{S}_i = \begin{pmatrix} x_i & y_i & 1 & 0 & 0 & 0 \\ 0 & 0 & 0 & x_i & y_i & 1 \end{pmatrix},$$

and $T_i$ is an isotropy compensated orientation tensor for control point i.

7. The method of claim 6, wherein the isotropy compensated orientation tensor $T_i$ is calculated by stacking all images of the sequence of 2D images onto each other to form a 3D image f, and defining $T_i$ as $T_i = A_i A_i^T + \gamma b_i b_i^T - \lambda_{i,min} I$, wherein I is the identity matrix, $\lambda_{min}$ is the smallest eigenvalue of $\hat{T}_i = A_i A_i^T + \gamma b_i b_i^T$, $A_i$ and $b_i$ are found by fitting the image intensity $f(x)$ of the control points $x_i$ to a second degree polynomial $f(x) \sim x^T A x + b^T x + c$, and $\gamma$ is a non-negative weight factor between even and odd parts of the image.

8. The method of claim 1, wherein each image in the sequence of 2D images of coronary arteries is mapped to a cardiac phase by a recorded electrocardiogram signal.

9. The method of claim 1, further comprising performing reverse-PCA analysis to estimate a vector $\hat{m}_p$ of centerline control points at cardiac phase p from PCA parameter vector $\hat{\alpha}_p$.

10. The method of claim 1, wherein the ROI in the subsequent image is determined by projecting a region around the centerline in the base phase image onto the subsequent image, and determining a centerline in the subsequent image by registering the centerline in the base phase image to the ROI in the subsequent image.

11. A non-transitory program storage device readable by a computer, tangibly embodying a program of instructions executed by the computer to perform the method steps for tracking coronary artery motion in a sequence of 2D images, the method comprising the steps of:

constructing a centerline model of a segmented vascular structure in a base phase image in a sequence of 2D images of coronary arteries acquired over one or more cardiac phases;

computing, for each pixel in a region-of-interest (ROI) in each subsequent image in the sequence of 2D images, a velocity vector that represent a change in position between the subsequent image and base phase image in the sequence of 2D images;

calculating positions of control points i in each phase p using the velocity vectors $\overline{v}_i^T = (v_{i,x}, v_{i,y})^T$; and applying PCA to a P×2N data matrix $X^T$ constructed from position vectors (x, y) of N centerline control points $\{V_0^{(p)}, V_1^{(p)}, \ldots, V_{N-1}^{(p)}\}$ for P phases to identify d eigenvectors corresponding to the largest eigenvalues of $XX^T$ to obtain d-dimensional linear motion model $$\hat{\alpha}_p \leftarrow \overline{m}_p + \sum_{i=1}^{d} \alpha_{p,i} v_i,$$

where $\overline{m}_p$ is a mean value of 2N control points positions (x, y) at phase p of the cardiac cycle, $v_i$ is an eigenvector of $U = cov(XX^T)$, and the $\alpha_{p,i}$'s are determined for each phase p, wherein a centerline model for a new image at phase p+1 is estimated by adding $\hat{\alpha}_p$ to each centerline control point of a previous frame at phase p.

12. The computer readable program storage device of claim 11, wherein said centerline model is parametrically represented by a set of vessel segments connected by a set of control points, wherein each vessel segment is approximated by a 2D B-spline curve parameterized by chord length.

13. The computer readable program storage device of claim 12, wherein the 2D B-spline curve for a $k^{th}$ centerline segment is defined as $$C_k(u) = \sum_{i=0}^{n_k-1} B_{i,q}(u) V_i^k,$$

wherein $u \in [0,1]$, the $\{v_i^k\} \in R^2$ are $n_k$ control points of the centerline and the $\{B_{i,q}\}$ are $q^{th}$-degree B-spline basis functions, wherein end values of each curve $C_k$ are constrained so that $$C_k(0) = V_0^k = (s_0 \in S_k), C_k(1) = V_{n_k}^k = (s_{m_k} \in S_k)$$

wherein $S_k$ denotes a $k^{th}$ segment, and $S_{m_k}$ denotes an $m^{th}$ point in the $k^{th}$ segment.

14. The computer readable program storage device of claim 11, wherein constructing said centerline model comprises processing said base phase image with a Hessian-based vessel enhancement filter, and computing centerlines by numerically integrating a directional vector field obtained from the Hessian-based vessel enhancement filter.

15. The computer readable program storage device of claim 14, the method further comprising receiving manual adjustments to the centerline model.

16. The computer readable program storage device of claim 11, wherein computing a velocity vector comprises calculating $\overline{v}_i = -\overline{S}_i \cdot \overline{Q}^{-1} \cdot q$, wherein $\nabla_i = (v_{x_i}, v_{y_i})$ is the velocity vector for control point i, $$Q = \sum_i Q_i = \begin{pmatrix} \overline{Q} & q \\ q^T & \alpha \end{pmatrix},$$

$$S_i = \begin{pmatrix} x_i & y_i & 1 & 0 & 0 & 0 & 0 \\ 0 & 0 & 0 & x_i & y_i & 1 & 0 \\ 0 & 0 & 0 & 0 & 0 & 0 & 1 \end{pmatrix},$$

$$\overline{S}_i = \begin{pmatrix} x_i & y_i & 1 & 0 & 0 & 0 \\ 0 & 0 & 0 & x_i & y_i & 1 \end{pmatrix},$$

and $T_i$ is an isotropy compensated orientation tensor for control point i.

17. The computer readable program storage device of claim 16, wherein the isotropy compensated orientation tensor $T_i$ is calculated by stacking all images of the sequence of 2D images onto each other to form a 3D image f, and defining $T_i$ as $T_i = A_i A_i^T + \gamma b_i b_i^T - \lambda_{i,min} I$, wherein I is the identity matrix, $\lambda_{min}$ is the smallest eigenvalue of $\tilde{T}_i = A_i A_i^T + \gamma b_i b_i^T$, $A_i$ and $b_i$ are found by fitting the image intensity $f(x_i)$ of the control points $x_i$ to a second degree polynomial $f(x) \sim x^T A x + b^T x + c$, and $\gamma$ is a non-negative weight factor between even and odd parts of the image.

18. The computer readable program storage device of claim 11, wherein each image in the sequence of 2D images of coronary arteries is mapped to a cardiac phase by a recorded electrocardiogram signal.

19. The computer readable program storage device of claim 11, the method further comprising performing reverse-PCA analysis to estimate a vector $\hat{m}_p$ of centerline control points at cardiac phase p from PCA parameter vector $\hat{\alpha}_p$.

20. The computer readable program storage device of claim 11, wherein the ROI in the subsequent image is determined by projecting a region around the centerline in the base phase image onto the subsequent image, and determining a centerline in the subsequent image by registering the centerline in the base phase image to the ROI in the subsequent image.

21. The computer readable program storage device of claim 11, the method further comprising determining model parameters $\vec{\alpha} = (\alpha_1, \ldots, \alpha_d)$ by minimizing $$\sum_{k=1}^{2} C_k(I_k, Y_0, M^d(\vec{\alpha}))$$

wherein $C_k(I_k, Y_0, \vec{m})$ is a similarity measure between a 2D image I of camera k and a preoperative 3-D centerline segmentation $Y_0$ transformed according to a rigid mapping $M^d$ and projected into a camera coordinate frame.

22. The computer readable program storage device of claim 11, the method further comprising fitting polynomial curves for each of the parameters $\alpha_i$ and the position/orientation of a sensor that reports its position and orientation using $$\alpha_{p,i} = \sum_{j=1}^{6} P_{p,j}^q(S_j),$$

wherein p is the cardiac phase, P is a $q^{th}$ order polynomial functions, and $S_j$ are the position and orientation of the sensor.

* * * * *